United States Patent

Koudal et al.

[11] Patent Number: 5,557,973
[45] Date of Patent: Sep. 24, 1996

[54] CORIOLIS-TYPE MASS FLOW SENSOR WITH A HELICAL MEASURING TUBE

[75] Inventors: Ole Koudal, Reinach; Alfred Wenger, Neftenbach, both of Switzerland

[73] Assignee: Endress + Hauser Flowtec AG, Switzerland

[21] Appl. No.: 303,706

[22] Filed: Sep. 9, 1994

[30]  Foreign Application Priority Data

Sep. 11, 1993 [EP] European Pat. Off. ............ 93114632

[51] Int. Cl.[6] ....................................................... G01F 1/84
[52] U.S. Cl. ................................ 73/861.355; 73/861.354
[58] Field of Search ............................ 73/861.38, 861.37

[56]  References Cited

U.S. PATENT DOCUMENTS

| | | |
|---|---|---|
| 4,711,132 | 12/1987 | Dahlin .................................. 73/861.38 |
| 4,730,501 | 3/1988 | Levien .................................. 73/861.38 |
| 4,733,569 | 3/1988 | Kelsey et al. . |
| 4,825,705 | 5/1989 | Hohloch et al. . |
| 4,957,005 | 9/1990 | Yard et al. . |
| 5,129,263 | 7/1992 | Chi . |
| 5,365,794 | 11/1994 | Hussain et al. ....................... 73/861.37 |

*Primary Examiner*—Hezron E. Williams
*Assistant Examiner*—Jewel V. Artis
*Attorney, Agent, or Firm*—Barnes & Thornburg

[57] ABSTRACT

A mass flow sensor is provided to be installed in a conduit through which a fluid flows. The mass flow sensor includes flanges for mounting to the conduit, a single measuring tube, an external support tube, and an internal support element. The measuring tube is fixed at its ends to the flanges and includes a vibrating portion having the shape of a circular constant-pitch helix. The external support tube includes external support tube ends fixed to the measuring tube or flanges. The internal support element includes internal support element ends fixed to the measuring tube adjacent to the flanges. The mass flow sensor further includes connecting elements evenly distributed along the vibrating portion of the measuring tube, interconnecting the vibrating portion of the measuring tube and the internal support element, and permitting only those modes of the vibrating portion of the measuring tube in which the centerline of the vibrating portion remains, as far as possible, substantially on a rest-position cylindrical enveloping surface of the modes. The mass flow sensor also includes a mechanism to excite the vibrating portion of the measuring tube into resonance vibrations perpendicular to its centerline.

18 Claims, 2 Drawing Sheets

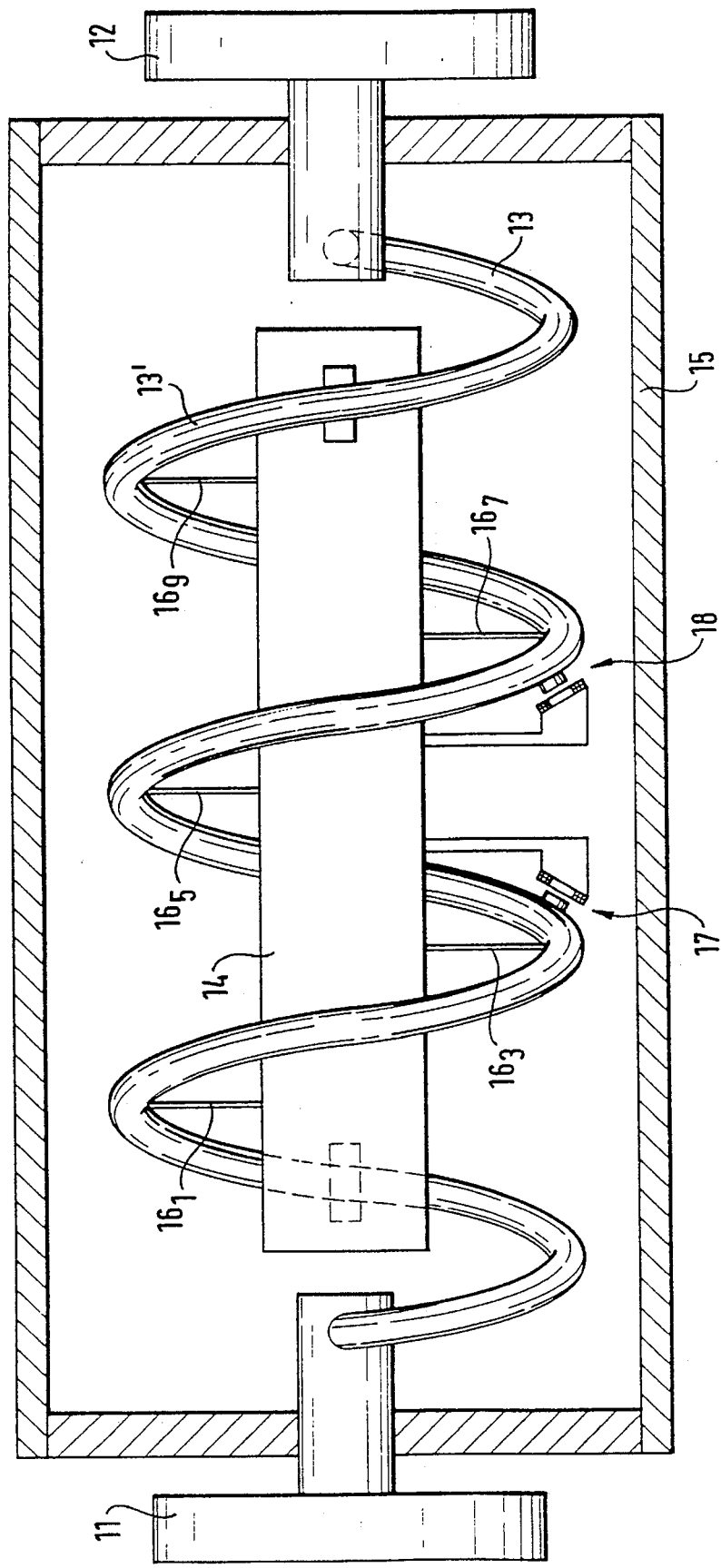

CORIOLIS-TYPE MASS FLOW SENSOR WITH A HELICAL MEASURING TUBE

FIELD OF THE INVENTION

The present invention relates to a mass flow sensor working on the Coriolis principle and having a helical measuring tube as a vibrating body through which flows a fluid to be measured.

BACKGROUND OF THE INVENTION

In the extensive prior art on Coriolis-type mass flow sensors with vibrating bodies in the form of by tubes, there are only two basic tube shapes, namely at least one straight tube or at least one arbitrarily bent or even twisted tube. Among the latter, the preferred shape is the U-shaped tube loop, i.e., one with a straight inlet-tube section having an inlet end, a straight outlet-tube section having an outlet end, and a tube bend connecting the inlet-tube section with the outlet-tube section.

With both tube shapes, the less the vibrating body is mechanically balanced, or in other words, the greater the mechanical nonequilibrium of the vibrating body, the more the measurement result will be dependent on the mounting position of the mass flow sensor. "Mechanically balanced", i.e., in mechanical equilibrium, means that the total momentum and the total angular momentum of the vibrating body must each be zero at all times.

The majority of currently commercially available Coriolis-type mass flow sensors implements this equilibrium by an axially symmetrical construction of the vibrating body; the latter has a plane of symmetry, and it is excited in a symmetrical vibration mode, so that it is balanced as perfectly as possible.

In most cases, this axial symmetry requires at least two parallel measuring tubes which vibrate in phase opposition in the manner of a tuning fork, so that the fluid stream has to be divided into at least two separate streams and recombined by means of suitable fittings. In some applications, such as in the sanitary area, this is considered to be disadvantageous and results in, among other things, a cost disadvantage.

On the other hand, the fittings can be avoided if the (two) measuring tubes are connected in series with respect to the fluid stream; this system is difficult to drain, let alone self-draining.

Among the measuring tubes which are not straight, the helical measuring tubes represent a shape described in several prior art references.

JP-A 61-290324 and the English-language abstract belonging thereto as well as U.S. Pat. No. 4,957,005 describe a mass flow sensor with a single helical measuring tube which, having a rigid bar interconnecting the individual loops at a point of their circumference, operates more or less like the measuring tubes of the above-mentioned axially symmetrical mass flow sensors having at least two tube loops vibrating in the manner of a tuning fork.

French Patent 1,139,048 describes (probably for the first time) a gyroscopic mass flow sensor which is designed to be installed in a conduit of a a given diameter through which flows a fluid to be measured, with a single measuring tube having essentially the shape of a circular cylindrical constant-pitch helix with several turns, with means which excite the measuring tube into vibrations, and with means which determine the mass flow rate of the fluid.

EP-A 210 408 describes a mass flow sensor working on the Coriolis principle which is designed to be installed, by means of flanges, in a conduit of a given diameter through which flows a fluid to be measured, with a single measuring tube having essentially the shape of a circular cylindrical helix with approximately one and a half turns and fixed at its ends in the respective flanges, with an external support tube having its ends fixed to the measuring tube near to the respective flanges, and with means which excite the measuring tube into vibrations about an axis which is perpendicular to, and does not intersect, the helix axis.

This mass flow sensor is obviously not balanced; its measurement results, particularly their zero stability, are therefore highly dependent on its mounting position.

The same applies to the Coriolis-type mass flow sensor disclosed in U.S. Pat. No. 4,733,569 which is designed to be installed in a conduit of a given diameter through which flows a fluid to be measured, with a single measuring tube having essentially the shape of a circular cylindrical helix with one and a half turns and fixed at its respective ends, with an internal, straight support element having only its ends fixed to the respective ends of the measuring tube, and with means which excite the measuring tube into vibrations perpendicular to the centerline of the measuring tube and parallel to the longitudinal axis of the support element.

Despite the above-described disadvantages, a mass flow meter with a single helical measuring tube is attractive for several reasons, namely because it permits a greater length of the measuring tube for a given size of the meter and, thus, provides high sensitivity, because its measuring tube can further be made in a continuous bending/twisting process and, thus, with high precision (as is possible with straight and circular-arc-shaped measuring tubes), and because it is self-draining in at least one mounting position.

It is, therefore, an object of the invention to improve mass flow sensors with a helical measuring tube so that they have largely balanced modes of vibration regardless of the density of the fluid while retaining the self-draining capability in at least one mounting position.

SUMMARY OF THE INVENTION

The invention therefore consists in the provision of a mass flow sensor working on the Coriolis principle which is designed to be installed, e.g., by means of flanges, in a conduit of a given diameter through which flows a fluid to be measured, with a single measuring tube fixed at its ends in the respective flanges, the vibrating portion of said measuring tube having the shape of a circular cylindrical constant-pitch helix with at least one turn, with an external support tube whose ends are fixed to the measuring tube near to the respective flanges, or to the respective flanges themselves, with an internal support element having only its ends fixed to the measuring tube near to the respective flanges, with connecting elements which are distributed along the vibrating portion of the measuring tube, interconnect said portion and the support element, and permit only all those modes of the vibrating portion of the measuring tube in which the centerline of said vibrating portion remains, as far as possible, on the rest-position cylindrical enveloping surface of said modes, and with means which excite the vibrating portion of the measuring tube into resonance vibrations perpendicular to its centerline.

In one preferred embodiment of the invention in which optimum balancing is achieved in all three directions in space, the vibrating portion of the measuring tube has two and a half turns and vibrates in the second mode. This is the (first) vibration mode with a vibration node midway between the two fixed ends.

In another preferred embodiment, the connecting elements are evenly distributed along the vibrating portion of the measuring tube.

In another preferred embodiment of the invention, the connecting elements are thin bars, particularly thin metal bars.

In a further preferred embodiment of the invention, the support element is disposed within the helix formed by the vibrating portion of the measuring tube.

BRIEF DESCRIPTION OF THE DRAWING

The detailed description particularly refers to the accompanying figures in which:

FIG. 1a is a cutaway top plan view of a mass flow sensor in accordance with the present invention; and FIG. 1b is a cutaway side elevational view of the mass flow sensor of FIG. 1a.

DETAILED DESCRIPTION OF THE DRAWING

Figure 1B:
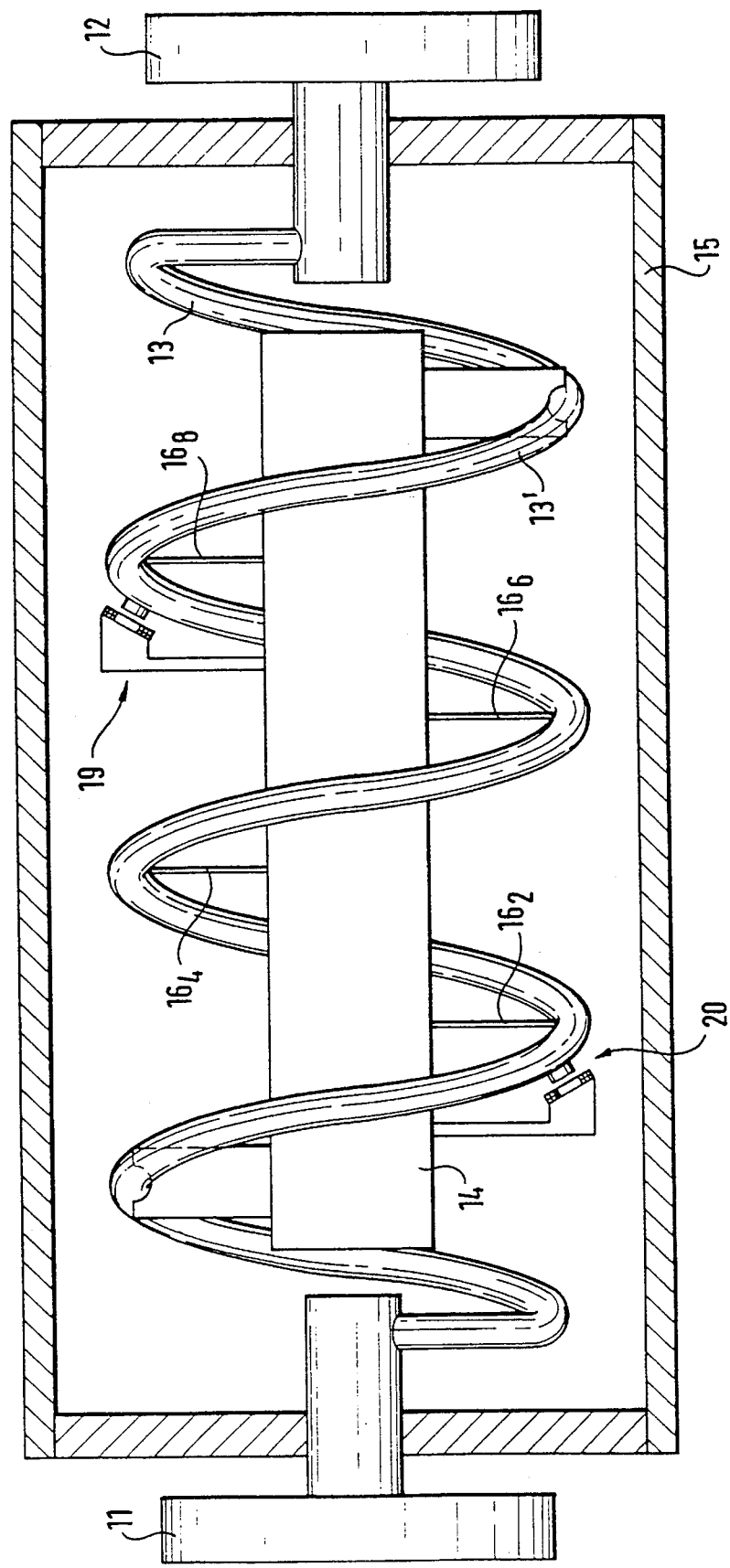

The mechanical portion of a mass flow sensor shown in schematic top and side views in FIGS. 1a and 1b, which can be mounted, e.g., by means of flanges 11, 12, in a conduit of a given diameter (not shown for convenience of illustration) through which flows a fluid to be measured, has a single measuring tube 13 of, e.g., stainless steel, titanium, or zirconium, whose vibrating portion 13' has the shape of a circular cylindrical constant-pitch helix with at least one turn, and which is fixed at its ends in the flanges 11 and 12, respectively.

In the embodiment of FIG. 1, the vibrating portion 13' of the measuring tube 13 has two and a half turns. Instead of by flanges, the mass flow sensor may be connected with the conduit by screw joints. The measuring tube 13 is also fixed in an external support tube 15 near to the respective flanges, or the support tube 15 may be rigidly connected with the flanges 11, 12.

The vibrating portion 13' of the measuring tube 13 is limited and held by an internal support element 14 which has only its ends fixed to the measuring tube 13 near to the respective flanges 11, 12. The vibrating portion 13' of measuring tube 13 includes a first end 21 connected to internal support element 14 and a second end 22 connected to internal support element 14. In the embodiment shown, the support element 14 is positioned within the helix formed by the vibrating portion 13' of the measuring tube 13, but it may also be disposed outside this "helix".

Aside from being fixed at its ends as mentioned above, the support element 14 is not fastened to any other parts of the mass flow sensor, particularly to the support tube 15.

Spaced along the vibrating portion 13' of the measuring tube 13 are connecting elements 16 which interconnect this portion and the support element 14. In the embodiment shown, the connecting elements are preferably thin metal bars which have a high stiffness in the longitudinal direction but permit lateral movements of the vibrating portion 13' of the measuring tube 13. If the support element 14 is located outside the "helix" as was mentioned above, the connecting elements may be elements subjected only to tension, such as wires.

In the embodiment shown, nine thin metals bars displaced by 90° in relation to each other are provided as connecting elements $16_1, 16_2, 16_3, 16_4, 16_5, 16_6, 16_7, 16_8, 16_9$, which are evenly distributed along the vibrating portion 13' of the measuring tube 13 and which are all connected with the inner support element 14. By means of the connecting elements 16 it is ensured that only those vibration modes of the measuring-tube portion 13' can occur or are permissible in which the centerline of this vibrating portion 13' remains, as far as possible, on the rest-position cylindrical enveloping surface of those modes.

In operation, the vibrating portion 13' of the measuring tube 13 is excited, by suitable means, into resonance vibrations perpendicular to its centerline. These means, as can be seen in FIG. 1a, comprise two electrodynamic driver arrangements 17, 18, each with coil and armature, for example, which are preferably mounted on both sides of the middle between the ends of the vibrating measuring-tube portion 13' at the same distance therefrom, in FIG. 1a at a distance of 180° from the middle. One part of each of the electrodynamic driver arrangements 17, 18 is attached to the measuring-tube portion 13', and the other to the internal support element 14.

The associated driver electronics are housed in a case, which is not shown. The driver electronics may be, for example, of the type described in U.S. Pat. No. 4,801,897, with the frequency of the exciting signal being controlled in accordance with the current total mass of the vibrating measuring-tube portion 13'.

The measuring-tube portion 13' of the embodiment shown in the drawing, which has two and a half turns (i.e, n= 2.5), is excited by the driver electronics in the second vibration mode, which, as was mentioned above, has a node midway between the two ends of the measuring-tube portion 13'. It can be shown theoretically and experimentally that for this preferred embodiment of the invention, virtually complete balance is achieved in all three directions in space.

Furthermore, in operation, a phase difference of the vibrations of the measuring-tube portion 13' is measured by means located at at least two points spaced along the measuring-tube portion. These means comprise two sensing elements 19, 20 and evaluation electronics, which are also housed in the case (not shown). In the driver arrangements 17, 18, one part of each of the sensing elements 19, 20 is attached to the measuring-tube portion 13', and the other part to the internal support element 14.

In FIG. 1b, the sensing elements 19, 20 are arranged symmetrically, each at a distance of 270° from the aforementioned middle of the measuring-tube portion 13'. These sensing elements may be, for example, optoelectronic sensors as are described in the above-mentioned U.S. Pat. No. 4,801,897, or, as indicated in FIG. 1b, electromagnetic sensors may be provided as are explained, for example, in EP-A 83 144.

The evaluation electronics determine the mass flow rate of the fluid from the above-mentioned phase difference and/or the density of the fluid from the vibration frequency of the measuring-tube portion 13'. Evaluation electronics for the above-mentioned optoelectronic sensors are described, for example, in the journal "Automatisierungstechnische Praxis atp", 1988, No 5, pages 224 to 230.

As has probably already become apparent, the invention makes use of the following property of a constant-pitch helix: Each of the points of the helix is spaced the same distance from the axis of a circular cylinder enveloping it.

A vibrating tube which is helical in this sense and is fixed at two points and has n turns between these points has a number of resonance vibration modes, of which many are unsuited for the mass flow sensor and, therefore, undesirable. These can be largely suppressed if, as defined in and ensured by the feature of the invention containing the connecting elements, only those vibration modes are permitted, so to speak, for which the above property is retained, with the above helix being the centerline of the vibrating measuring-tube portion 13'.

We claim:

1. A mass flow sensor configured to be installed in a conduit through which a fluid flows, said mass flow sensor comprising flanges for mounting to said conduit, a single measuring tube fixed at its ends to said flanges and having a vibrating portion, said vibrating portion of said measuring tube having the shape of a circular cylindrical constant-pitch helix with at least one turn, an external support tube having external support tube ends fixed to at least one of said measuring tube and said flanges, an internal support element having internal support element ends fixed to said measuring tube adjacent said flanges, connecting elements being distributed along said vibrating portion of said measuring tube, interconnecting said vibrating portion of said measuring tube and said internal support element, and permitting only those modes of said vibrating portion of said measuring tube in which the centerline of said vibrating portion remains, as far as possible, substantially on a rest-position cylindrical enveloping surface of said modes, and means for exciting said vibrating portion of said measuring tube into resonance vibrations perpendicular to its centerline.

2. A mass flow sensor as claimed in claim 1, wherein said vibrating portion of said measuring tube has two and a half turns and is excited in the second mode.

3. A mass flow sensor as claimed in claim 1, wherein said connecting elements are evenly distributed along said vibrating portion of said measuring tube.

4. A mass flow sensor as claimed in claim 1, wherein said connecting elements are thin bars, particularly thin metal bars.

5. A mass flow sensor as claimed in claim 1, wherein said support element is disposed within said helix formed by said vibrating portion of said measuring tube.

6. A mass flow sensor as claimed in claim 2, wherein said connecting elements are evenly distributed along said vibrating portion of said measuring tube.

7. A mass flow sensor as claimed in claim 2, wherein said connecting elements are metal bars.

8. A mass flow sensor as claimed in claim 2, wherein said support element is disposed within said helix formed by said vibrating portion of said measuring tube.

9. A mass flow sensor configured to be installed in a conduit through which a fluid flows, said mass flow sensor comprising a single measuring tube fixed at its ends to said conduit, said measuring tube including a vibrating portion having a first end and a second end and the shape of a circular cylindrical constant-pitch helix with at least one turn, an internal support element appended to said measuring tube, and at least one connecting element extending between and fixed to said internal support element and said vibrating portion of said measuring tube.

10. The mass flow sensor of claim 9, wherein said first end of said vibrating portion is appended to said internal support element and said second end of said vibrating portion is appended to said internal support element.

11. The mass flow sensor of claim 9, wherein said internal support element is only appended to said vibrating portion of said measuring tube.

12. The mass flow sensor of claim 9, further comprising an external support tube fixed to said measuring tube and configured to substantially enclose said vibrating portion of said measuring tube.

13. The mass flow sensor of claim 9, wherein said at least one connecting element includes a plurality of connecting elements extending between and fixed to said internal support element and said vibrating portion of said measuring tube, said plurality of connecting elements are evenly distributed between said first and second ends of said vibrating portion of said measuring tube.

14. The mass flow sensor of claim 9, wherein the internal support element is situated within said helix formed by said vibrating portion of said measuring tube.

15. A mass flow sensor configured to be installed in a conduit through which a fluid flows, said mass flow sensor comprising a single measuring tube fixed at its ends to said conduit, said measuring tube including a vibrating portion having a first end and a second end and the shape of a circular cylindrical constant-pitch helix with at least one turn, an internal support element appended to said measuring tube, and a plurality of connecting elements extending between and fixed to said internal support element and said vibrating portion of said measuring tube, said plurality of connecting elements are evenly distributed between said first and second ends of said vibrating portion of said measuring tube.

16. The mass flow sensor of claim 15, wherein said first end of said vibrating portion is appended to said internal support element and said second end of said vibrating portion being appended to said internal support element.

17. The mass flow sensor of claim 15, wherein said internal support element is only appended to said vibrating portion of said measuring tube.

18. The mass flow sensor of claim 15, wherein said connecting elements are distributed along said vibrating portion of said measurement tube so that only all those modes of said vibrating portion of said measuring tube in which the centerline of said vibrating portion remains substantially on the rest-position cylindrical enveloping surface of said modes.

\* \* \* \* \*